UNITED STATES PATENT OFFICE.

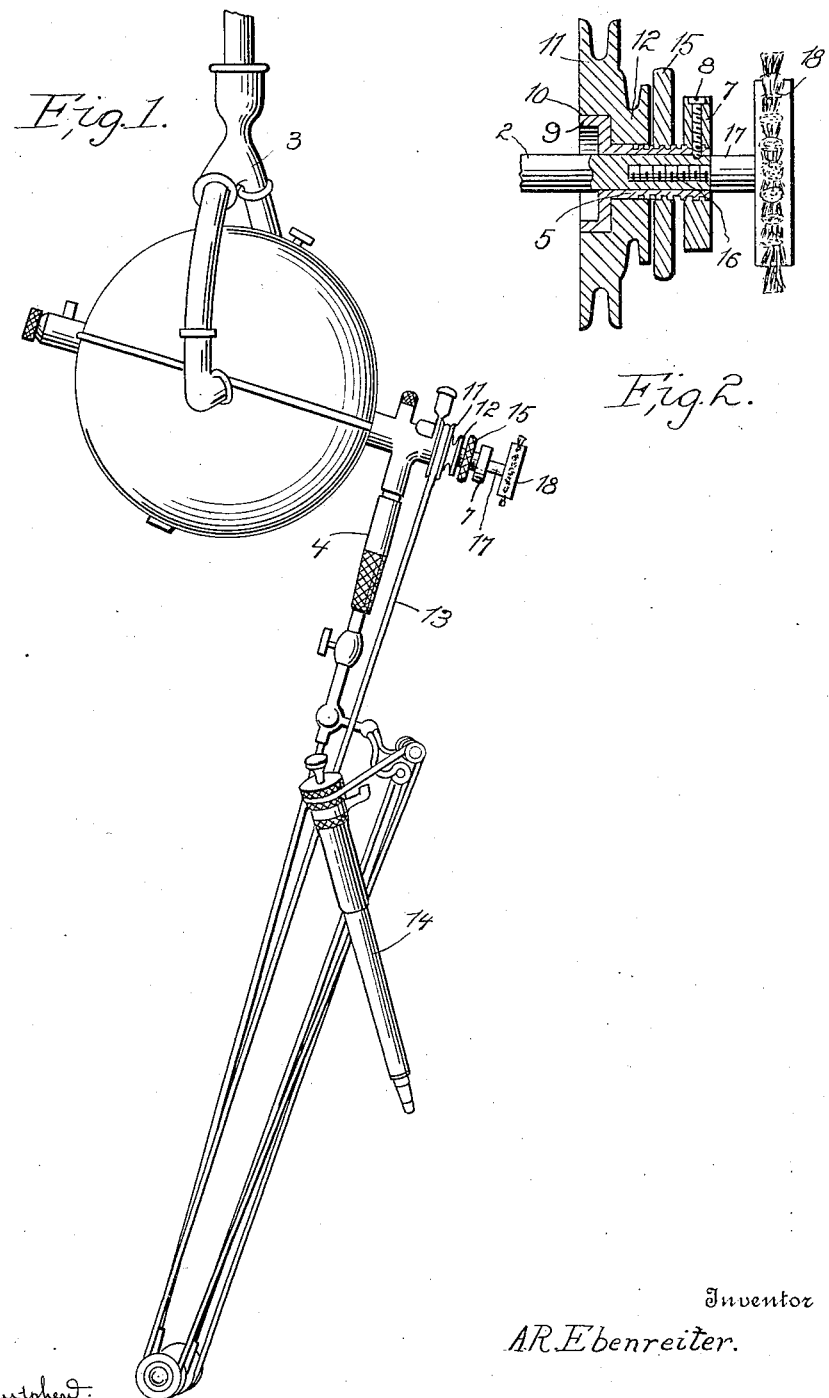

ALFRED R. EBENREITER, OF SPOKANE, WASHINGTON.

FRICTION-PULLEY.

1,090,462.

Specification of Letters Patent. Patented Mar. 17, 1914.

Application filed December 18, 1912. Serial No. 737,522.

*To all whom it may concern:*

Be it known that I, ALFRED R. EBENREITER, a citizen of the United States, residing at Spokane, in the county of Spokane and State of Washington, have invented certain new and useful Improvements in Friction-Pulleys, of which the following is a specification, reference being had to the accompanying drawings.

This invention relates to new and useful improvements in friction pulleys and more particularly to a friction pulley which is particularly adapted for use upon dental engines, the object of the invention is to provide a friction pulley of this character whereby some of the operated parts may be thrown into and out of engagement with the main shaft so that the said parts may remain stationary while the other parts are in motion.

Another object of the invention is to provide a device of this character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a perspective view of a dental engine showing my improved friction pulley applied thereto; and Fig. 2 is an enlarged longitudinal sectional view of the pulley.

Referring more particularly to the drawings, 1 indicates the motor which operates the main shaft 2 and which is suspended by suitable supporting means 3. Mounted upon the shaft adjacent the motor and suspended therefrom is the usual well known apparatus which is generally applied to dental engines as shown at 4. Mounted upon the shaft 2 and arranged adjacent the member 4 is a sleeve 5, the periphery of which is provided with the screw threads 6. Mounted upon one end of the sleeve is a band wheel 7 which is rigidly secured to the sleeve by means of the set screw 8, said set screw passing through the band wheel and through the sleeve, and engaging the shaft 2 to securely hold the sleeve against rotation thereon. The end of the sleeve 5 opposite the band wheel 7 is provided with an enlarged annular portion 9 which is adapted to be disposed within a similar shaped recess 10 formed in the pulley 11. The pulley 11 is provided at one side thereof with an extension 12 which forms a second pulley upon which the cord 13 may be arranged so as to vary the speed of the hand piece 14, it being understood that when the cord 13 is arranged upon the pulley 12 the hand piece 14 will be operated at a higher rate of speed than when the cord is on the pulley 11.

Adjustably mounted for longitudinal movement upon the threaded portion of the shaft 5 is a collar 15 which is adapted to be adjusted toward and away from the pulley 11 so that when the collar is turned up and frictionally engaged with the pulley 11, said pulley, which is loosely mounted upon the shaft 2 will be rotated with the shaft. Threaded in the outer end of the shaft is a shank 16 having a shaft 17 formed upon the outer end thereof and upon which is mounted a brush 18, it being understood that when it is desired to operate both the brush wheel and the other parts of the machinery including the hand piece, the collar 15 will be turned up and frictionally engaged with the pulley 11, but if it is desired to use only the brush, the other parts may be disengaged so as to remain stationary by turning the collar 15 away from the pulley 11 so that the pulley 11 will remain idle upon the sleeve 5.

From the above it will be seen that by the simple adjustment of the collar 15, the brush wheel 18 may be readily operated while the other parts of the device remain stationary. More or less danger exists to a patient in the rapid revolution of the bur in the end of the hand piece, 14, while the attention of the operator is confined to the use of the brush wheel 18. With my improvement, the pulley and hand piece remain idle while the brush wheel is in motion, thus obviating all danger to the patient, saving wear upon the cord 13 and adding greatly to the convenience of the operator. It will also be understood that in order to adjust the collar 15, the engine will have to be stopped so that the collar may be adjusted by hand. In view of the fact that these engines are usually run by electricity, it will be understood that very little time will be absorbed in stopping the engine and adjusting the collar 15.

It will be apparent that I have provided a simple and durable friction pulley for dental engines whereby the same may be quickly and easily disengaged so that a portion of the operated parts will remain stationary while the other parts are in motion.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the class described including a shaft, a sleeve mounted upon said shaft, a wheel secured to one end of the sleeve, an annular enlarged portion formed on the other end of said sleeve, a pulley loosely mounted upon the sleeve and provided with an annular recess adapted to receive said enlarged portion and a collar in threaded engagement with said sleeve and adapted to be rotated to frictionally engage the pulley whereby the pulley may be rotated with the sleeve.

In testimony whereof I hereunto affix my signature in the presence of two witnesses.

ALFRED R. EBENREITER.

Witnesses:
JNO. L. DIRKS,
H. M. JONES.

Copies of this patent may be obtained for five cents each, by addressing the "Commissioner of Patents, Washington, D. C."